… … …

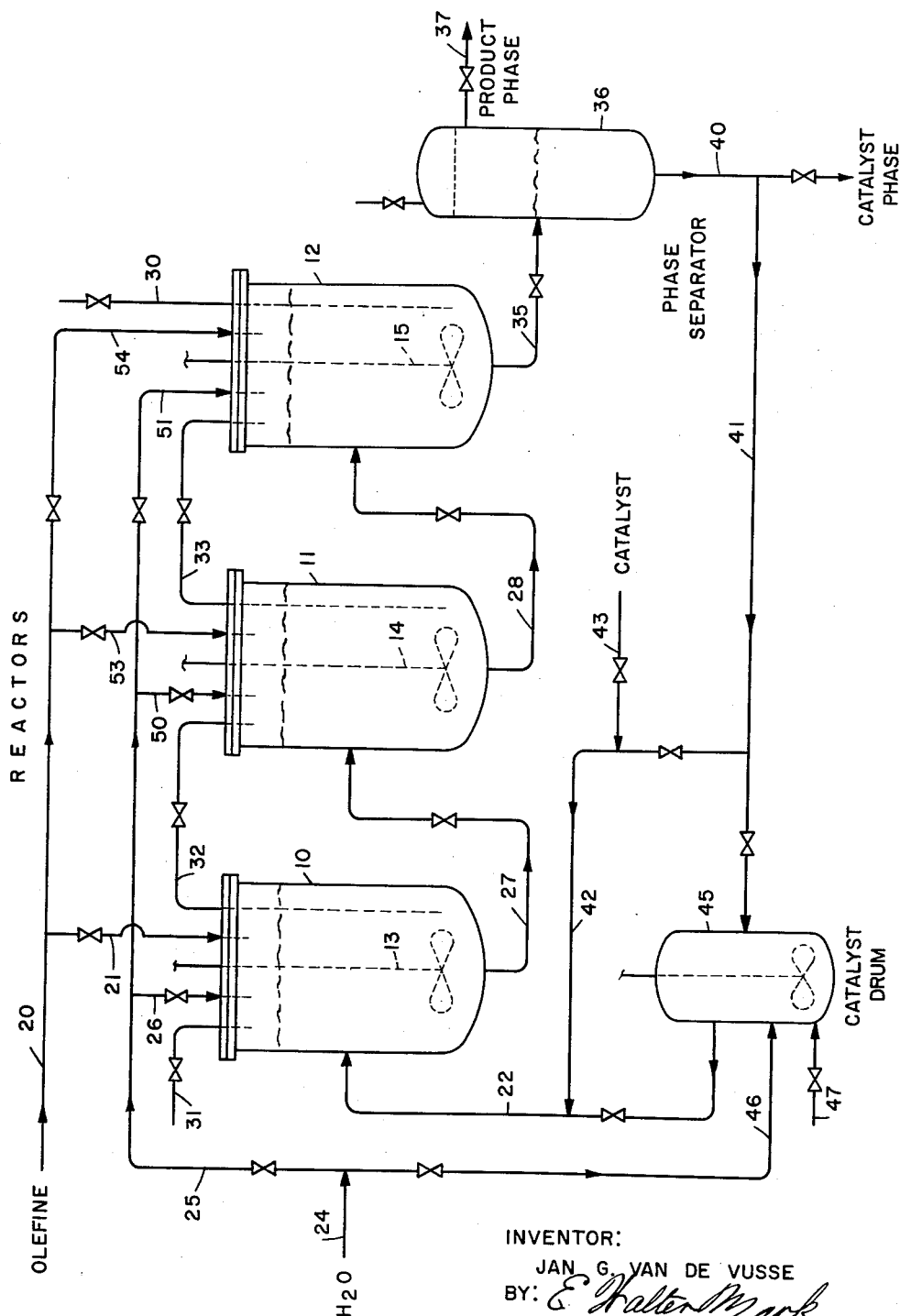

United States Patent Office 3,059,006
Patented Oct. 16, 1962

3,059,006
PRODUCTION OF ORGANIC ACIDS
Jan G. van de Vusse, Amsterdam, Netherlands, assignor to Shell Oil Company, a corporation of Delaware
Filed Dec. 10, 1959, Ser. No. 858,797
Claims priority, application Netherlands Dec. 24, 1958
13 Claims. (Cl. 260—413)

This invention relates to the production of carboxylic acids. The invention relates more particularly to improvements in the production of carboxylic acids from starting materials comprising carbon monoxide, mono-olefinically unsaturated compounds and water.

It is known that organic acids are obtained by contacting mixtures containing carbon monoxide, water and an organic compound, such as for example an olefin, with certain specific catalysts under controlled conditions of temperature and pressure. Many of the processes disclosed heretofore rely upon the use of exceedingly high pressures, often in combination with relatively high temperatures. The practicality of such processes is often further handicapped by inability to produce a particularly desired acid as the predominant reaction product. Processes disclosed heretofore carried out in liquid phase are generally executed under conditions rendering difficult, if not impossible, the maintenance of constant conditions throughout the reaction zone, thereby producing by-products in substantial amounts.

More recently it has been found that with the aid of certain highly acidic catalysts the use of severe reaction conditions, including high pressures, can be avoided if the operation is conducted in two successive stages with the exclusion of water in the first stage and the addition of all of the water required to form the acid in the second stage. In a modification of this type of operation the use of certain specific catalysts enables the addition of a fraction, but not all, of the water of reaction in the first stage of the two stage process.

The need to rely upon two separate reaction stages to complete the desired reaction, each requiring the maintenance of different controlled reaction conditions therein, adds materially to the complexity and cost of the process. A further disadvantage of the two stage type of operation resides in the relatively high catalyst cost generally incurred therein due to the fact that the second stage generally converts the catalyst to a condition in which it is unsuitable for recycling to the system without costly operative procedure.

In co-pending application Serial No. 858,609, filed December 10, 1959, there is disclosed and claimed a process which now makes possible the direct production of the desired carboxylic acids in a continuous single stage operation at moderate conditions of temperature and pressure. In the process of said co-pending application carboxylic acids are produced by introducing charge materials comprising carbon monoxide, an olefin, water in stoichiometrical excess over said olefin, and a liquid highly acidic catalyst in the reaction zone, while maintaining a homogeneous liquid phase of substantially constant composition at relatively constant temperature in the range of from about —10 to about 150° C. in said reaction zone throughout the course of the process, and continuously withdrawing liquid phase from the reaction zone at such a controlled rate that the condition of constant composition within the reaction zone is maintained. A distinguishing feature of the process resides in the ability to maintain optimum reaction conditions uniformly throughout the entire reaction zone. The full advantages inherent in the process are, however, not always attainable when using as carbon monoxide charge a dilute carbon monoxide such as, for example, water gas, generator gas, coke oven gas, and the like. When using substantially pure carbon monoxide, the carbon monoxide pressure above the liquid phase in the reaction zone is generally approximately that at which the gas is introduced into the reaction zone. However, when using a dilute carbon monoxide such as, for example, a water gas, wherein the partial pressure is relatively low to begin with, the partial pressure of the carbon monoxide above the liquid phase in the reaction zone will be even lower than that in the charge line to the reaction zone. A low carbon monoxide pressure above the liquid phase corresponds to a low concentration of carbon monoxide reactant in the liquid phase and generally results in a low reaction rate and increased production of unwanted by-products, such as polymers, relative to the desired carboxylic acids. To reduce this drawback it would be necessary to ensure a higher CO pressure but in this case there would be a smaller difference from the partial CO pressure prevailing in the inlet line and consequently a lower CO conversion.

It is an object of the present invention to provide an improved process enabling the more efficient production of carboxylic acids from olefinically unsaturated organic compounds, water, and carbon monoxide, particularly suited to the use of diluted carbon monoxide gas as source of the carbon monoxide reactant.

Another object of the present invention is the provision of an improved catalytic, liquid phase process enabling the more efficient production of carboxylic acids from olefins, water and dilute carbon monoxide wherein disadvantages, such as reduced reaction rate, low yield, and high by-product formation, heretofore encountered when utilizing diluted carbon monoxide as the source of the carbon monoxide reactant, are obviated to at least a substantial degree.

A more particular object of the invention is the provision of an improved process enabling the more efficient production of carboxylic acids having from nine to eleven carbon atoms to the molecule from mono-olefinic hydrocarbons having from eight to ten carbon atoms to the molecule by the reaction of said olefins with dilute carbon monoxide and water in the presence of a liquid highly acidic catalyst. Other objects and advantages of the invention will become apparent from the following detailed description thereof made with reference to the attached drawing wherein the single figure represents more or less diagrammatically one form of apparatus suitable for carrying out the process of the invention.

In accordance with the invention, carboxylic acids having at least four carbon atoms to the molecule are produced by continuously passing a liquid stream of charge materials consisting essentially of an olefinically unsaturated organic compound containing at least three carbon atoms, a highly acidic catalyst consisting essentially of a complex of boron trifluoride and a polybasic inorganic acid, and an amount of water in stoichiometrical excess over said olefinic compound, consecutively through a plurality of reactors connected in series flow, continuously introducing a carbon monoxide-containing gas into a terminal reactor of said plurality of reactors, passing gas phase comprising carbon monoxide-containing gas consecutively through said plurality of reactors, maintaining a substantially homogeneous liquid phase of relatively constant composition at substantially constant temperature in the range of from about −10 to about 150° C. and at a pressure of from about 20 to about 175 atmospheres in each of said reactors, continuously withdrawing gas phase and liquid phase from a terminal reactor, and separating carboxylic acid from the liquid phase so withdrawn. In a preferred embodiment of the invention gas phase and liquid phase are passed countercurrently through the plurality of serially connected reactors.

Olefinic compounds employed as charge to the process of the invention comprise the mono-olefinically unsaturated organic compounds having at least three carbon atoms to the molecule. Examples of such suitable olefinic compounds are the monoolefinic hydrocarbons such as propylene, butylene-1, butylene-2, isobutylene, branched or unbranched pentenes, hexenes, heptenes, octenes, nonenes, decenes and higher alkenes; polymers and copolymers of alkenes, such as di-isobutylene, propylene tetramer; cyclic alkenes, such as cyclopentene and cyclohexane, as well as unsaturated fatty acids or hydroxy fatty acids which may form unsaturated fatty acids under the reaction conditions, etc. Commercially available mixtures comprising these alkenes may also be used, for example, olefin-containing hydrocarbon fractions such as obtained by thermal vapor phase cracking or paraffin wax in the presence of steam. These fractions not only contain alkenes but generally also paraffins, naphthenes and aromatics, which usually do not take part in the synthesis. These presence promotes the separation into layers of the reactor effluence, the same also being true of the alkenes unconverted during the reaction.

The process of the invention is not limited with respect to the source of the carbon monoxide-containing gas employed. Thus the carbon monoxide-containing gas may comprise any mixture containing carbon monoxide in admixture with one or more normally gaseous materials such as, for example, hydrogen, nitrogen, carbon dioxide, lower paraffins, and the like. Suitable carbon monoxide-containing gas charge materials comprise, for example, commercially available water gas, coke oven gas, generator gas, carbon monoxide-containing tail gases from industrial operations, etc. The invention is not limited with respect to the concentration of the carbon monoxide in the carbon monoxide-containing gas charged. Efficient operation is obtained with gas containing substantially less than 50% carbon monoxide.

The process of the invention is executed in the presence of a liquid, highly acidic, inorganic compound as catalyst. Suitable catalysts comprise the liquid complex mixtures obtained by combining boron trifluoride, water and a polybasic inorganic acid such as, for example, phosphoric acid, sulfuric acid and the like. Preferred catalysts comprise the complex mixtures of boron trifluoride-phosphoric acid-water containing a mol ratio of phosphoric acid to boron trifluoride in the range of from about 0.8:1.3 to about 1.3:0.8 having a water content of from about 7 to about 12% by weight (based upon total boron trifluoride and phosphoric acid). A particularly preferred catalyst comprises the complex mixtures containing about equimolar amounts of boron trifluoride and phosphoric acid and approximately 10% by weight of water (based upon the total weight of boron trifluoride plus phosphoric acid).

Referring to the drawing; the reaction zone of the process comprises a plurality of reactors such as, for example, reactors 10, 11 and 12 arranged in series flow to permit the passage of liquid and gaseous streams serially therethrough. Though three reactors are shown in the present illustrative description of the invention it is to be understood that only two or a greater number of reactors serially arranged may be employed within the scope of the invention. The reactors are each provided with suitable means to enable agitation of the liquid contents, for example, stirrers 13, 14 and 15. Means not shown in the drawing are provided to maintain the contents of the reactors at the desired reaction temperature.

An olefinically unsaturated organic compound having at least three carbon atoms, for example a mono-olefin or a mixture of mono-olefins, such as a $C_8$–$C_{10}$ olefin-containing hydrocarbon fraction is introduced into the first reactor of the series, reactor 10, by means of valved lines 20 and 21. The olefinic charge so introduced may emanate in part or entirety from an outside source, or may comprise olefinic compounds recycled from conventional recovery means, not shown in the drawing, associated with the reaction system.

A liquid, highly acidic catalyst, for example, a complex mixture consisting essentially of boron trifluoride, phosphoric acid and water, emanating at least in part from within the system as described below, is passed through valved line 22 into reactor 10. When the amount of water required for the reaction is not introduced into the system in its entirety with the catalyst additional water may be separately introduced into the system, for example, with the aid of lines 24, 25 and 26.

Liquid phase is continuously passed from reactor 10 into reactor 11 by means of valved line 27, and from reactor 11 into reactor 12 by means of valved line 28.

A carbon monoxide-containing gas, for example water gas, is passed continuously serially through reactors 10, 11 and 12. Means are preferably provided to assure thorough contact of the gas with the liquid phase passing through the system. The order in which the carbon monoxide-containing gas flows serially through the reactors may be the same as that of the liquid flow. When employing parallel flow the carbon monoxide-containing gas is continuously introduced into the system through valved line 31. Gas phase comprising carbon monoxide-containing gas passes from reactor 10 to reactor 11 through valved line 32, and from reactor 11 into reactor 12 through valved line 33. With such parallel flow of the reactants, residual gas phase is eliminated from the terminal reactor 12 by means of valved line 30. In a preferred embodiment of the invention carbon monoxide-containing gas passes through the system in countercurrent flow to the liquid phase. In such countercurrent operation the carbon monoxide-containing gas is introduced into the system through valved line 30 and residual gas phase is eliminated from terminal reactor 10 by means of valved line 31. Essential to the attainment of the objects of the invention is the introduction of the carbon monoxide-containing gas into only a terminal reactor of the system.

Also essential to the attainment of the objects of the invention is the maintenance of the liquid phase in each of the reactors in the form of a substantially homogeneous liquid phase of relatively constant composition. Homogeneity of the liquid phase is obtained by suitable agitation of the reaction mixture with the aid of the stirrers, by the rate of passage of the gas phase therethrough and optionally with aid of additional conventional means not shown in the drawing.

The rate at which charge materials are introduced into the reaction system and withdrawn therefrom is controlled to assure the maintenance of the desired conditions of substantially constant composition of the liquid phase in each of the reactors. Substantially constant composition of the liquid reaction mixture in the reactors is obtained at a constant supply rate of the reactants and of the catalyst, as well as of the materials which may be supplied together with the said components and the catalyst, provided the temperature and pressure are also kept constant and the reaction mixture remains homogeneous. Small deviations from the constant conditions envisaged may occur during operation, for example as a result of irregularities or inaccuracies in the working of the apparatus used for the supply of materials or the temperature control. These deviations are compensated for by taking measures to regulate the process.

When the composition of liquid phase is substantially constant in a given reactor, the concentration in this reactor of each component remains substantially constant. For each of the components to be reacted therefore the supply per unit of time and per unit of volume of a given reactor should be equal to the sum of consumption and withdrawal. In the case of the product the production per unit of time and per unit of volume of the reactor in question should be equal to the withdrawal.

As a component of the reaction mixture the catalyst also successively flows through the various reactors. In some cases the catalyst forms a single liquid phase with the organic components of the reaction mixture. In other cases two liquid phases are present, one of which generally contains most of the organic material and the other most of the catalyst. Herein and in the attached claims the term "homogeneous" is to be understood as including the case in which one of the liquid phases present in a particular reactor is uniformly distributed in the other liquid phase.

Liquid phase is continuously withdrawn from terminal reactor 12 through valved line 35 and introduced into a suitable stratifying zone, for example a chamber 36. Within chamber 36 the effluence from reactor 12 forms two separate layers, an organic phase comprising the carboxylic acid product and unconverted hydrocarbons, and a catalyst phase comprising catalyst components and water. Although generally not necessary, diluents may be introduced into chamber 36 from an outside source by means not shown in the drawing to increase the rate of phase separation. Such diluents comprise water, saturated hydrocarbons, etc.

Organic phase is passed from chamber 36 through line 37 to suitable conventional product recovery means wherein carboxylic acids are recovered. Recovery means may comprise one or more such steps as distillation, crystallization, salt or ester formation, and the like. Unconverted hydrocarbons are recycled in part, or entirety, to the reaction system.

The catalyst phase separated in chamber 36 is passed therefrom to the reaction system. Thus, at least a part of the catalyst phase may be passed from chamber 36 through valved lines 40, 41, 42 and 22 directly into the first reactor 10. A valved line 43 is provided for the introduction of additional catalyst from an outside source into the system should this be required. A part or all of the catalyst phase withdrawn from chamber 36 may be introduced into a catalyst adjustment zone, for example catalyst drum 45. Within catalyst drum the recycle catalyst may be treated to adjust its composition before returning it to the reaction system. Additional catalyst components may be added thereto with the aid of valved line 47. Its water content may be adjusted by the introduction of water into drum 45 by means of valved line 46. In a preferred embodiment of the invention at least a substantial part of the water required for the reaction within reactors 10, 11 and 12 is introduced into catalyst drum 45. From drum 45 the adjusted catalysts is passed to reactor 10 through valved line 22. Alternatively, the catalyst may be returned in part to one or more reactors other than the first.

Water circulates through the system together with the catalyst. The water, which is converted into carboxylic acid, as well as any water losses from any other cause is replaced by supplying water. This water may be supplied to the catalyst before the latter is returned to the system. In some cases the water required to make up the water consumption and losses is already wholly or partly added to the reaction mixture which has left the last reaction space, in which case this water may aid or promote the separation of the phases in drum 36.

If desired water required for the reaction may be introduced into the system at other points. If desired, the water coming from outside the system through line 24 may be supplied not only to the first reactor 10, but also to reactor 11 and/or 12 by means of valved lines 50 and 51.

The molar ratio of the amount of water to the amount of alkenes charged is generally maintained in the range of from about 1:1 to about 30:1, preferably from about 2:1 to about 6:1. The greater this ratio the greater should be the weight ratio of catalyst supplied to alkenes supplied. The water supplied usually is in the range of from about 2 to about 15% by weight of the total quantity of liquid inorganic material (mainly the catalyst) supplied during the same period of time. The catalyst decreases in activity at excessive and too low water to catalyst ratios.

In each of the successive reactors the reaction mixture is in equilibrium with a carbon monoxide pressure which is lower than that associated with the preceding reactor (calculated in the direction of the gas), and higher than the carbon monoxide pressure associated with the next reactor (again calculated in the direction of the gas). Hence, if this system is compared with a system in which the reaction mixture is kept homogeneous in but a single reactor, the same initial pressure of carbon monoxide and the same conversion being maintained in both systems, the desired reaction in the system takes place according to the invention at a higher carbon monoxide pressure, viz., at a higher average reaction rate.

If the olefinic charge is introduced solely into the first reactor, the concentration of olefin as well as that of the carbon monoxide would decrease in stages in the series of successive reaction spaces. With respect to the ratio of the desired product (carboxylic acid) to undesired product (polymer) the situation would not be more favorable than in a system of a single reaction space. In accordance with the preferred method of executing the present invention, a portion of the olefin charge is made to bypass the first reactor 10 and enters the second reactor 11 with the aid of valved line 50. Any polymerization which this portion of the olefinic charge would have undergone in the first reactor is thereby avoided. Line 51 enables the introduction of a part of the olefinic charge into reactor 12. Equal amounts of olefinic charge may be introduced into each of the several reactors, or the amount introduced may vary from one reactor to the other.

The carbon monoxide-containing gas is, however, always introduced into a terminal reactor. When the starting material is water gas having a normal carbon monoxide content, a considerable improvement is obtained by passing from a single reaction space in which the reaction mixture has a homogeneous and constant composition, to a system of two or three similar reaction spaces connected in series, according to the invention. If this number is increased the greater complexity of the apparatus always leads to a smaller increase in the conversion. Within certain limits, the rule is that the lower the partial CO pressure of the carbon monoxide-containing gas, the greater is the advantage of having a larger number of reaction spaces connected in series.

The temperature maintained in each of the reactors is generally in the range of from about −10° C. to about 150° C. Excellent results are obtained at temperatures in the range 40° C. to 100° C. The carbon monoxide pressure generally is maintained in excess of about 20 atm. gauge. Suitable values of this pressure are usually in the range of from about 50 to about 150 atm. gauge. The average residence time of the reaction mixture in the reaction system is often in the range of from about 1 to about 4 hours.

Reaction conditions may be varied within the said limits according to the type of the alkenes to be converted and the specific catalyst selected for this purpose. With the use of liquid complex mixtures of phosphoric acid, boron trifluoride and water, in which the $H_3PO_4:BF_3$ mol ratio is in the range of from about 0.8:1.3 to about 1.3:0.8, preference is given to: a water content of from 5 to 11% by weight (based on the sum of the $H_3PO_4$, $BF_3$ and $H_2O$ in the system), temperatures in the range of from about 40° C. to about 80° C. and CO pressures of from about 50 to about 150 atm. gauge. Lower or higher water contents may be used in accordance with increase or decrease in the $H_3PO_4:BF_3$ ratio. With the use of sulphuric acid containing 4 to 10% by weight of water the reaction will be preferably executed at about room temperature and at the higher pressures within the specified range.

Under the above-defined conditions olefins having at least three carbon atoms to the molecule result in a reaction mixture in which the predominating organic acid is a secondary or tertiary carboxylic acid. The organic acids obtained will generally correspond to the compounds obtained by removing an olefinic charge and attaching a carboxy group (—COOH) directly to one, and a hydrogen atom to the other, of the two olefinically-unsaturated carbon atoms linked by the olefinic bond in the charge material. Propylene results in isobutyric acid; butene-1 and butene-2 in 2-methyl butyric acid; isobutylene in trimethylacetic acid; octene-1 and octene-2 in 2-methyl octenoic acid; cyclohexene in acids comprising methyl cyclophentane carboxylic acid and cyclohexane carboxylic acid, etc. Mixtures of olefines will result in the obtaining of mixtures of fatty acids having on the average one more carbon atom to the molecule than the olefinic components of the charge.

Although in the foregoing detailed description of the invention the use of a reaction zone comprising a plurality of separate reactors arranged in series flow has been stressed, it is to be understood that the invention is not limited to the use of any one specific type of apparatus but may employ any suitable type of apparatus providing a plurality of reaction spaces in series communication. Thus, suitable type of apparatus for carrying out the process of the invention comprises a vertically positioned cylindrical chamber, or tower, divided by means of horizontal partitions into a plurality of superimposed compartments, and provided with suitable means for the passage of liquid and gas streams serially through said plurality of compartments.

For the purpose of simplicity parts of apparatus not necessary for a full understanding of the invention, such as, for example, pumps, valves, and the like, have been omitted from the drawing.

The invention is further illustrated by the following example:

Example

Fatty acids were prepared from a mixture of olefins having from 8 to 10 carbon atoms, in a reaction system substantially as shown in the attached drawing, with the exception, however, that the number of reactor spaces was varied. For comparison an experiment was carried out with a single reactor space.

The starting alkenes were a fraction of a product obtained by thermal vapor phase cracking of a paraffinic feedstock in the presence of steam. The original diene content had disappeared by partial hydrogenation. In percentages by weight the mono-alkene content was 76%, in addition to which 17% of saturated hydrocarbons and 7% of aromatics were present. Of the said 76% of mono-alkenes, 38.5% were unbranched, 20% branched and 17.5% cyclic alkenes. The mono-alkenes mainly had a cis- or trans-configuration, only 2% were alpha-alkenes, while 1% had a $CH_2=CR_1R_2$ structure (in which $R_1$ and $R_2$ are alkyl groups).

The catalyst contained equimolar amounts of $H_3PO_4$ and $BF_3$, and also water. The total amount of water present in each reactor space was about 8.5% by weight of the sum of the $H_3PO_4$, $BF_3$ and $H_2O$ present in the same reactor space.

The reaction was carried out in cylindrical, stainless steel reactors connected in series flow, provided with a jacket for the supply of steam or cooling water for the purpose of controlling the temperature of the reaction mixture, and with a stirrer. The volume of a liquid reaction mixture was kept equal in all reactors. For the combined reactors, the volume in each experiment was 10 liters.

The source of carbon monoxide was a gas containing 42% by volume of CO, the remainder being inert. The partial pressure of the CO in the supply line to the first reactor was 160 atm. abs. The above-described mixture of hydrocarbons, which contained 76% of olefin was supplied in each experiment at a total rate of 920 grams per hour. This amount of olefin was distributed over the reactors in such a way that the ratio of fatty acid production of polymer formation was approximately the optimum. A quantity of 3.39 kg. of catalyst was supplied to the first reactor per hour. This figure does not include the organic matter which circulated together with the catalyst. The amount of this organic material was 12% by weight, based on the sum of $H_3PO_4$, $BF_3$ and $H_2O$. The water content of the catalyst supplied to the first reactor was 8.5% by weight (also based on the sum of $H_3PO_4$, $BF_3$ and $H_2O$). In addition an amount of extra water was supplied to each reactor corresponding to the amount of water consumed in the said reactor. All supplies and withdrawals were continuous. The reactor spaces were invariably kept at a temperature of 60° C. The contents of the reactors were stirred at a speed of 750 r.p.m.

Under these conditions the total conversion of olefin in all experiments was about 80%, and the fatty acid yield, based on the total amount of olefin converted, was 67 mol percent. These results as well as those given below, were found after a steady state had been reached in all reactors.

Effluence from the last reactor was led into a separating vessel where it was separated into two layers. The bottom layer (the catalyst) was returned to the first reactor. The top layer was freed from acid inorganic compounds by water-washing. The fatty acids were then converted into their sodium salts by adding a 25% solution of NaOH in a 5% excess. The solution of the soaps was separated from unconverted alkenes and by-products, extracted with a light, aromatic-free gasoline, acidified with HCl, and again extracted with an aromatic-free gasoline. The gasoline was distilled from the last extract obtained, after which the remaining fatty acid mixture was weighed.

The following table shows for the systems of 1, 2 and 3 reactor spaces included in the comparative experiment, the distribution of the olefin and the partial CO pressure found at the end. The total conversion of CO was calculated each time from this partial CO pressure.

| Number of Reactors | Distribution of Olefin over the Reactors, percent | | | $P_{CO}$ in last Reactor, Atm. Abs. | Total Conversion of CO, percent |
|---|---|---|---|---|---|
| | 1 | 2 | 3 | | |
| 1 | 100 | | | 101 | 50 |
| 2 | 60 | 40 | | 80 | 63 |
| 3 | 50 | 30 | 20 | 73 | 67 |

It can be clearly seen that the total CO conversion increases with the number of reactor spaces, and also that the conversion is smaller than that of the preceding space.

Experiments were also carried out in order to ascertain the total pressure of the CO-containing gas required to effect a total CO conversion of 50% in systems having 1, 2 and 3 reaction spaces, other conditions remaining as described above. The following results show that this total pressure drops considerably with an increasing number of reactors.

| Number of Reactors | 1 | 2 | 3 |
|---|---|---|---|
| Total Pressure, Atm. Abs. | 380 | 285 | 250 |

I claim as my invention:

1. In a process for the production of mono-carboxylic acids having from about four to about thirteen carbon atoms wherein charge materials consisting essentially of mono-olefinically unsaturated hydrocarbon having from about three to about twelve carbon atoms, water in stoichiometrical excess of said olefinic compound and a carbon monoxide-containing gas are contacted with a liquid highly acidic catalyst obtained by combining boron trifluoride with a polybasic inorganic acid selected from the group consisting of phosphoric acid and sulfuric acid said catalyst containing from about five to about twelve percent by weight of water in a reaction zone at a temperature in the range of from about 20 to about 150° C. at a pressure in excess of about 20 atmospheres, the improvement which comprises employing as said reaction zone a plurality of reactors arranged in series flow, continuously passing said charge materials in series flow through said plurality of reactors, continuously introducing said carbon monoxide-containing gas in only a terminal reactor of said plurality of reactors, maintaining a substantially homogeneous liquid phase of relatively constant composition at substantially constant temperature in each of said reactors, continuously withdrawing liquid phase from a terminal reactor of said plurality of reactors, and separating carboxylic acid from said withdrawn liquid phase.

2. In a process for the production of a mono-carboxylic acid having from about four to about thirteen carbon atoms wherein charge materials consisting essentially of a mono-olefinic hydrocarbon having from about three to about twelve carbon atoms, water in an amount at least the stoichiometrical equivalent of said olefin and a carbon monoxide-containing gas are contacted with a liquid catalyst consisting essentially of a complex of boron trifluoride with a phosphoric acid which catalyst contains from about five to about twelve percent of water in a reaction zone at a temperature in the range of from about 20 to about 150° C. at a pressure in excess of about 20 atm., the steps which comprise employing as said reaction zone a plurality of reactors arranged in series flow, continuously passing said charge materials in series flow through said plurality of reactors, continuously introducing substantially all of a said carbon monoxide-containing gas in only a terminal reactor of said plurality of reactors, maintaining a substantially homogeneous liquid phase of relatively constant composition at a substantially constant temperature in each of said reactors, continuously withdrawing liquid phase from a terminal reactor of said plurality of reactors, and separating carboxylic acids having at least four carbon atoms from the liquid phase so withdrawn.

3. In a process for the production of mono-carboxylic acids having from about four to about thirteen carbon atoms to the molecule wherein charge materials comprising a mono-olefinic hydrocarbon having from about three to about twelve carbon atoms to the molecule, a carbon monoxide-containing gas, and water in an amount at least the stoichiometrical equivalent of said olefin, are contacted with a liquid catalyst comprising a complex of boron trifluoride with phosphoric acid which catalyst contains from about five to about twelve percent of water at a temperature of from about 20 to about 150° C. and at a pressure in the range of from about 20 to about 175 atm. in a reaction zone, the steps which comprise employing as said reaction zone a plurality of reactor spaces arranged in series flow, continuously passing said charge materials serially through said plurality of reactor spaces, continuously introducing all of said carbon monoxide-containing gas in only a terminal reactor space of said plurality of reactor spaces, maintaining a substantially homogeneous liquid phase of relatively constant composition at a substantially constant temperature in each of said reactor spaces throughout the course of said process, continuously withdrawing liquid phase from a terminal reactor space of said plurality of reactor spaces, and separating carboxylic acid having at least four carbon atoms to the molecule from said liquid phase so withdrawn.

4. In the process for the production of mono-carboxylic acids having from about four to about thirteen carbon atoms wherein charge materials consisting essentially of a mono-olefinic hydrocarbon having from about three to about twelve carbon atoms, water in an amount at least the stoichiometrical equivalent of said olefin, and a carbon monoxide-containing gas are contacted with a liquid catalyst consisting essentially of a complex of boron trifluoride with phosphoric acid which catalyst contains from about five to about twelve percent of water at a temperature of from about 40 to about 80° C. at a pressure in the range of from about 50 to about 175 atm. in a reaction zone, the steps which comprise employing a plurality of reactors arranged in series flow as said reaction zone, continuously passing said charge materials in series flow through said plurality of reactors, continuously introducing substantially all of said carbon monoxide-containing gas into a terminal reactor of said plurality of reactors, maintaining a substantially homogeneous liquid phase of relatively constant composition at substantially constant temperature in each of said reactors, withdrawing liquid phase from a terminal reactor of said plurality of reactors, separating an aqueous catalyst phase and a carboxylic acid-containing organic phase from the liquid phase so withdrawn, and recycling said aqueous catalyst phase to the first reactor in said plurality of reactors.

5. The process in accordance with claim 4 wherein said liquid catalyst contains a mol ratio of phosphoric acid to boron trifluoride in the range of from about 0.8:1.3 to about 1.3:0.8.

6. The process in accordance with claim 4 wherein at least a substantial part of the water required for the reaction is added to said catalyst recycled to said first reactor.

7. The process in accordance with claim 4 wherein a part of said olefinic charge is introduced into each of said reactors.

8. The process in accordance with claim 4 wherein water is charged to the reaction in a mol ratio of water to olefinic charge of from about 1:1 to about 30:1.

9. The process for the production of mono-carboxylic acids having from nine to eleven carbon atoms to the molecule which comprises continuously passing charge materials consisting essentially of a $C_8$–$C_{11}$ olefin containing hydrocarbon fraction, an amount of water at least the stoichiometrical equivalent of said olefinic charge, a carbon monoxide-containing gas, and a liquid catalyst consisting essentially of a complex comprising boron trifluoride, phosphoric acid and containing from about five to about twelve percent water through a plurality of reactors arranged in series flow, introducing substantially all of said carbon monoxide-containing gas in only a terminal reactor of said plurality of reactors, maintaining a substantially homogeneous liquid phase of relatively constant composition at a constant temperature in the range of from about 40 to about 80° C. and at a pressure in the range of from about 50 to about 175 atm. in each of said reactors, continuously withdrawing liquid phase from a terminal reactor in said plurality of reactors, and separating carboxylic acids having nine to eleven carbon atoms from said liquid phase so withdrawn.

10. The process in accordance with claim 9 wherein an aqueous catalyst phase is separated from said liquid phase withdrawn from said terminal reactor and recycled to the first reactor in said plurality of reactors.

11. The process in accordance with claim 10 wherein at least a part of the water required to complete the reaction is added to said catalyst recycled to said first reactor.

12. The process in accordance with claim 9 wherein said carbon monoxide-containing gas is water gas.

13. The process in accordance with claim 9 wherein said carbon monoxide-containing gas is passed serially through said plurality of reactors countercurrently to the liquid phase flow.

References Cited in the file of this patent

UNITED STATES PATENTS

| | | |
|---|---|---|
| 1,959,219 | Reed | May 15, 1934 |
| 2,876,241 | Koch et al. | Mar. 3, 1959 |
| 2,911,422 | Ercoli | Nov. 3, 1959 |